(12) United States Patent
Walter

(10) Patent No.: US 6,234,925 B1
(45) Date of Patent: May 22, 2001

(54) TRANSMISSION

(75) Inventor: Bernhard Walter, Oberkirch (DE)

(73) Assignee: LuK Getriebe-Systeme GmbH, Buhl/Baden (DE)

( * ) Notice: Subject to any disclaimer, the term of this patent is extended or adjusted under 35 U.S.C. 154(b) by 0 days.

(21) Appl. No.: 09/216,231

(22) Filed: Dec. 18, 1998

(30) Foreign Application Priority Data

Dec. 22, 1997 (DE) ............................................... 197 57 177

(51) Int. Cl.[7] ........................... F16H 61/00; F16H 55/56; F16F 1/06
(52) U.S. Cl. .................. 474/18; 474/28; 474/70; 267/180
(58) Field of Search ................... 474/18, 28, 69, 474/70, 101, 111, 102, 10–12, 14, 13, 17, 903; 267/166.1, 279, 180, 168, 61

(56) References Cited

U.S. PATENT DOCUMENTS

| 3,405,929 | * | 10/1968 | Kaplan ........................... 267/166.1 |
| 4,077,619 | * | 3/1978 | Borlinghaus ..................... 267/166.1 |
| 4,717,368 | * | 1/1988 | Yamaguchi et al. ................ 474/28 |
| 5,046,991 | | 9/1991 | Friedmann . |
| 5,156,573 | * | 10/1992 | Bytzek et al. ..................... 474/903 X |
| 5,295,915 | | 3/1994 | Friedmann . |
| 5,711,730 | | 1/1998 | Friedman et al. . |
| 5,879,253 | * | 3/1999 | Friedmann et al. ................ 474/18 |
| 6,015,359 | * | 1/2000 | Kunii ............................... 474/18 |

FOREIGN PATENT DOCUMENTS

| 40 36 683 A1 | 5/1991 | (DE) . |
| 42 34 294 A1 | 4/1993 | (DE) . |
| 195 44 644 A1 | 6/1996 | (DE) . |
| 308260 | * 12/1988 | (JP) . |

* cited by examiner

Primary Examiner—David Fenstermacher
Assistant Examiner—Marcus Charles
(74) Attorney, Agent, or Firm—Darby & Darby

(57) ABSTRACT

A continuously variable speed transmission with a first adjustable pulley on an input shaft, a second adjustable pulley on an output shaft, and an endless chain or belt trained over the pulleys employs at least one coil spring which biases one flange of one of the pulleys axially of the respective shaft. The coil spring has larger-diameter end convolutions and smaller-diameter intermediate convolutions. A plenum chamber of a torque sensor or of at least one of several piston-cylinder units—which serve to adjust the axially movable flanges of the pulleys—is bounded in part by a check valve in the form of a composite seal having a rigid annular element and an elastic annular element. One of the annular elements surrounds the other element.

18 Claims, 5 Drawing Sheets

TRANSMISSION

BACKGROUND OF THE INVENTION

The invention relates to a transmission, such as an infinitely or continuously variable speed transmission with pulleys having conical flanges, with a first pair of conical flanges and a second pair of conical flanges, each pair having an axially movable and an axially fixed conical flange, and looped torque transmitting means trained over the pairs of conical flanges, with at least one energy storing device disposed to operate between an axially fixed element and an axially movable conical flange.

Such transmissions became known, for example, from the published German patent application Ser. No. 195 44 644 and the corresponding U.S. Pat. No. 5,711,730. For example, such transmission can employ a coil spring, e.g., a compression spring, in order to achieve the establishment of a stress between an axially fixed element and an axially shiftable conical flange.

If such transmissions employ a cylindrical spring, it can happen that, when the spring is subjected to a pronounced axial stress, individual convolutions of the spring yield radially outwardly and become clamped between the axially movable conical flange and the axially fixed element. This entails the development of a pronouced adverse effect upon the operation of the transmission.

OBJECT OF THE INVENTION

The object underlying the present invention is to improve transmissions of the aforedescribed character as concerns their construction, cost and the mode of operation. The transmission is to be provided with an energy storing device which is rotatably confined in actual use of the transmission and does not accidentally block any of the elements.

SUMMARY OF THE INVENTION

In accordance with the invention, this is accomplished in that the energy storing device has a cross section slightly departing from a cylindrical shape, the cross section decreasing in a first axial region and increasing again in a second axial region. This ensures that, when the energy storing device is subjected to a pronounced axial stress, it assumes a shape such that the radially inner portions of the convolutions lie against an extension of the axially movable conical flange and do not migrate radially outwardly which could result in a clamping or blocking of discrete component parts of the transmission.

It is advisable to employ an energy storing device which is a compression spring or coil spring with discrete convolutions, at least the radially outer convolutions having—as seen in the radial direction—a diameter which is larger than that of at least some convolutions which are disposed radially inwardly as seen in the radial direction.

It is also desirable if the cross section of the energy storing device exhibits the shape of a double cone. It is also possible to impart to the cross section the shape of a dual conical frustum.

Furthermore, in accordance with an additional embodiment, it is advisable if the axially fixed element and/or the axially movable conical flange is provided with a receptacle which receives and supports against radially outward movement the convolutions located at the end zones of the energy storing device.

It is of advantage if the receptacle constitutes a circumferentially extending groove which is provided in the axially movable conical flange, which is surrounded radially by an extension and which receives at least one convolution at the end zone of the energy storing device, the convolution being supported by the extension as seen in the radial direction and being supported by the conical flange in the axial direction.

It is of advantage if the receptacle of the axially fixed element supports at least one convolution of the energy storing device, at the end region of the energy storing device, against movement outwardly as seen in the radial direction and also in the axial direction.

The invention further relates to a transmission, such as an infinitely variable transmission with pulleys having conical flanges, with a first pair of conical flanges and a second pair of conical flanges, each pair having an axially movable and an axially fixed conical flange, looped torque transmitting means trained over the pairs of conical flanges, and at least one plenum chamber. The plenum chamber is sealed by a seal which comprises an elastic sealing ring and an essentially shape-retaining annular element.

It is of advantage if the elastic sealing ring is disposed radially within the essentially shape-retaining annular element.

In accordance with another embodiment of the invention, it is advisable that the elastic sealing ring be disposed radially outwardly of the essentially shape-retaining annular element.

BRIEF DESCRIPTION OF THE DRAWINGS

The invention will be described in greater detail with reference to the drawings. There are shown in.

DESCRIPTION OF PREFERRED EMBODIMENTS

Figure 1:
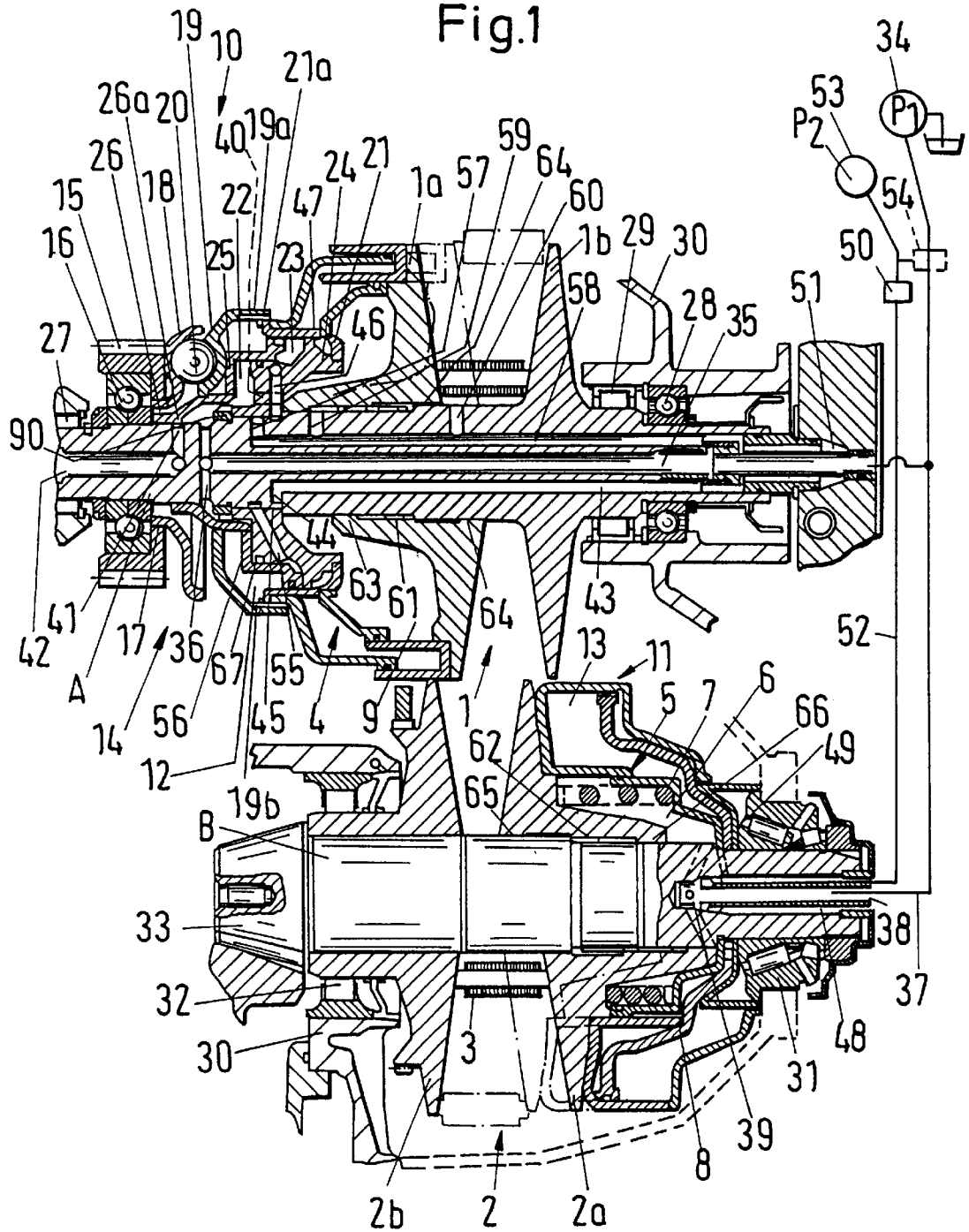
FIG. 1 a sectional view of a portion of an infinitely variable speed transmission with pulleys having conical flanges, FIG. 2 a sectional view of a pair of conical flanges forming part of a modified transmission, FIG. 3a an enlarged view of a detail in the structure of FIG. 2, FIG. 3b the same detail as in FIG. 3a but with the parts in different positions, FIG. 4 a portion of an energy storing device, FIG. 5a a sealing ring, and FIG. 5b a different sealing ring.

The embodiment of an infinitely variable transmission with pulleys having conical flanges, a portion of which is shown in FIG. 1, comprises a pair 1 of driving flanges which are non-rotatably mounted on a drive shaft A, and a pair 2 of flanges non-rotatably mounted on a driven shaft B. Each pair of flanges has an axially movable flange 1a and 2a, and an axially fixed flange 1b and 2b. A surrounding means in the form of a chain 3 is provided and transmits torque between the two pairs of flanges.

The upper half of the illustration of the corresponding pair 1, 2 of flanges shows those axial positions of the respective flanges 1a, 1b and 2a, 2b which correspond to the maximum transmission ratio of the transmission to a lower speed (underdrive), whereas the lower halves of these illustrations show those positions of the cooperating flanges 1a, 1b and 2a, 2b which correspond to the maximum transmission ratio to the higher speed (overdrive).

The flanges of the pair 1 are axially stressed by an adjusting device 4 which constitutes a piston-cylinder unit.

In a similar manner, the conical flanges of the pair 2 are adapted to be stressed by an adjusting device 5, which can also constitute a piston-cylinder unit, to bear against the chain 3. In the plenum chamber 6 of the piston-cylinder unit 5, there is provided an energy storing device 7 which constitutes a coil spring and urges the axially movable flange 2a in the direction toward the axially fixed flange 2b. When the chain 3 is located in the radially inner portion of the space between the flanges of the pair 2, the stressing force furnished by the energy storing device 7 is greater than when the chain is located in the larger-diameter region of the pair 2 of flanges. This means that, as the ratio of the transmission increases toward the higher speed, the clamping force furnished by the energy storing device 7 also increases. On the one hand, the device 7 bears directly upon the axially movable flange 2a and, on the other hand, it reacts against a cupped structural element 8 which bounds the plenum chamber 6 and is rigidly connected to the driven shaft B.

The piston-cylinder units 4, 5 operate in parallel with additional piston-cylinder units 10, 11 which serve to change the ratio of the transmission. The plenum chambers 12, 13 of the piston-cylinder units 10, 11 can be alternately filled with or discharge a pressurized medium, depending upon the required transmission ratio. To this end, and depending upon the requirements, the plenum chambers 12, 13 can be connected with a source of pressurized fluid, such as a pump, or with an evacuating conduit. Thus, in the event of a change of the transmission ratio, one of the chambers 12, 13 is filled with a pressurized medium to thus increase its volume, whereas the other chamber 13, 12 is at least partially emptied, i.e., its volume is reduced. Such alternating increases of pressure in and partial evacuations of the plenum chambers 12, 13 can be effected by way of a suitable valve. As concerns the design and the mode of operation of such valve, reference should be had, for example, to published German patent application Ser. No. 40 36 683 and to the corresponding U.S. Pat. No. 5,046,991. The patented valve constitutes a square head slide valve and receives pressurized fluid from a source constituting a pump. The disclosure of this patent is incorporated herein by reference.

In order to generate an at least torque-dependent pressure, there is provided a torque sensor 14 the operation of which is based on a hydromechanical principle. The torque sensor 14 transmits to the pair 1 of conical flanges that torque which is being transmitted thereto by a driver gear or driver pinion 15. The driver gear 15 is journalled on the drive shaft A by a roller bearing 16 and is non-rotatably connected with a disc cam 18, which is supported in the axial direction by the driver gear, by a form-locking connection or by a toothed portion 17. The torque sensor 14 comprises the axially fixed disc cam 18 and an axially shiftable disc cam 19. These disc cams comprise sloping ramps which flank spreading elements in the form of balls 20. To this end, the disc cam 19 comprises a radially outer portion 19a which faces axially away from the balls 20 and carries teeth 19b cooperating with complementary teeth 21a of a component 21 which is secured to the drive shaft A as seen in the axial and circumferential directions. The teeth 19b and the complementary teeth 21a are designed in such a way that the components 19 and 21 can move axially relative to each other.

The parts of the torque sensor 14 bound two plenum chambers 22, 23. The plenum chamber 22 is defined by an annular component 24 which is rigidly connected to the drive shaft A, as well as by two portions or components 25, 26 which form part of or are carried by the disc cam 19. The annular plenum chamber 23 is located practically entirely radially outwardly of the annular plenum chamber 22 and is also axially offset relative to the latter. The second plenum chamber 23 is also bounded by the annular component 24 as well as by the sleeve-like component 21 which is fixedly secured to the component 24, and further by the annular member 25 which is rigidly connected to the disc cam 19, which acts as a piston and is axially movable. The annular component 24 has internal teeth which mate with external teeth of the shaft A to hold the component 24 against rotation on the drive shaft, and the component 24 is braced in the axial direction by a nut 90.

The input shaft A, which carries the torque sensor 14 and the pair 1 of conical flanges, is journalled in a housing or case 30 by a needle bearing 27 at that side of the pair 1 which faces the torque sensor, by a ball bearing 28 which is located at the side of the pair 1 facing away from the torque sensor and can take up axial stresses, and by a roller bearing 29 which is designed to take up radial stresses. The driven shaft B, which carries the pair 2 of conical flanges, has an end portion adjacent the adjusting devices 5 and 11 and mounted in the housing 30 by a twin conical roller bearing 31 which can take up radial forces as well as axial forces developing in both axial directions, and the driven shaft is further mounted in a roller bearing 32 located at that side of the pair 2 of conical flanges which faces away from the adjusting devices 5, 11. That end of the driven shaft B which is remote from the adjusting devices 5, 11 carries a bevel gear 33 which can be connected, for example, with a differential.

In order to generate a pressure which is modulated by the torque sensor 14 at least in dependency upon the torque and which is required to tension the infinitely variable speed transmission, there is provided a pump 34 which is connected to the plenum chamber 22 of the torque sensor 14 by way of a central channel 35 provided in the drive shaft A, and at least one radial channel 36. Furthermore, the pump 34 is connected to the plenum chamber 6 of the piston-cylinder unit 5 at the second pair 2 of conical flanges by way of a conduit 37. The connecting conduit 37 communicates with a central channel 38 which is provided in the driven shaft B and which, in turn, communicates with the plenum chamber 6 by way of at least one radial channel 39.

The plenum chamber 22 of the torque sensor 14 is connected with the plenum chamber 9 of the piston-cylinder unit 4 by a channel 40 which is offset relative to the plane of FIG. 1 in a circumferential direction and, therefore, is shown by broken lines. The channel 40 is provided in the annular component 24 which is rigidly connected to the shaft A. Thus, the channel 40 establishes a permanent connection between the first plenum chamber 22 and the plenum chamber 9. The drive shaft A is further provided with at least one fluid evacuating channel 41 which communicates, or which can communicate, with the plenum chamber 22 and the effective cross-sectional area of which can be varied in dependency at least upon the magnitude of the transmitted torque. The evacuating channel 41 communicates with a central bore 42 of the shaft A which bore, in turn, can be connected with a conduit adapted to convey the oil flowing out of the torque sensor 14, e.g., to a suitable location for lubrication of component parts. The axially movable ramps—i.e., the disc cam 19 which is axially movably mounted on the drive shaft A, has an inner portion 26a which constitutes a sealing element cooperating with the evacuating channel 41 in order to seal the evacuating channel 41 to a greater or lesser extent, depending at least upon the magnitude of transmitted torque. Thus, the sealing portion 26a cooperates with the channel 41 to constitute a valve or a flow restrictor. The disc cam 19 acts as a control piston which can open or close the evacuating opening or the evacuating conduit 41 to thus establish in the plenum chamber 22 a pressure generated by the pump 34 and depending at least upon the magnitude of the torque being transmitted between the two disc cams 18, 19. A corresponding pressure is established in the plenum chambers 9, 6 because the plenum chamber 22 communicates with the plenum chamber 9 and also with the plenum chamber 6 by way of the channels and/or conduits 35, 36, 37, 38 and 39.

Due to parallel connection of the piston-cylinder units 4, 5 with the piston-cylinder units 10, 11, the forces which are being applied to the axially movable flanges 1a, 2a in response to the pressure that is being applied by the torque sensor 14 are added to the forces which act upon the flanges 1a, 2a a as a result of the pressure developing in the chambers 12, 13 for the setting of the ratio of the transmission.

The plenum chamber 12 receives pressurized fluid by way of a channel 43 which is provided in the shaft A and communicates with an annular groove 45 of the shaft A by way of a radial bore 44. The annular groove 45 communicates with at least one channel 46 which is provided in the annular component 24 and establishes a connection with a radial passage 47 provided in the sleeve-like component 21 and discharging into the plenum chamber 12. The plenum chamber 13 is supplied with oil in an analogous manner, namely by way of a channel 48 which surrounds the channel 38 and communicates with the plenum chamber 13 by way of radially extending connecting channels 49. The channels 43 and 48 are supplied with fluid by a common source of pressurized fluid through the intermediary of at least one valve 50 and connecting conduits 51, 52. The source 53 of pressurized fluid which is connected to the valve 50 resp. system of valves 50, can constitute a discrete pump or it can be constituted by the aforementioned pump 34; in the latter case, it is necessary to provide a suitable volume- or pressure-distributing system 54 which can comprise several valves. Such alternative solution is indicated by broken lines.

The plenum chamber 23, which is effective in parallel with the plenum chamber 22 when it contains pressurized fluid, is sealed from the source of pressurized fluid when te individual parts of the pair 1 of conical flanges assume the relative positions shown in the upper half of the illustration of this pair; the reason is that the channels resp. bores 55, 56, 57, 58, 59, 60, which communicate with the plenum chamber 23, are not connected to a source of pressurized fluid, such as the pump 34. In view of the position of the axially shiftable flange 1a, the flow of fluid through the radial bore 60 is fully unobstructed so that the fluid in the chamber 23 is not under pressure. The axial force being applied, for the transmission of torque, from the torque sensor 14 to the disc cams resp. disc cam 19 is taken up solely by the pressure cushion which is being built up in the plenum chamber 22. The pressure in the plenum chamber 22 increases in response to the increase of the torque which is to be transmitted. As already mentioned above, such pressure is regulated by the portion 26a which acts as a throttle valve, and by the evacuating channel 41.

When the transmission ratio is being changed to a higher value, the conical flange 1a is shifted in a direction to the right toward the conical flange 1b. The effect of such shifting upon the pair 2 of conical flanges is that the conical flange 2a moves axially and away from the axially fixed conical flange 2b. As already mentioned hereinbefore, the upper halves of the representations of the pairs 1, 2 of conical flanges show those positions of the conical flanges 1a, 1b and 2a, 2b relative to each other which correspond to the extreme positions for a shifting of the transmission into a lower gear, whereas the lower halves of these representations show those positions of the conical flanges 1a, 1b and 2a, 2b relative to each other which correspond to the other extreme positions of the conical flanges 1a, 1b and 2a, 2b relative to each other, namely when the transmission is to effect the rotation of the shaft B at a maximum speed.

In order to shift from the transmission ratio shown in the upper halves of representations of the pairs 1, 2 of conical flanges into the transmission ratio shown in the lower halves of the respective representations, the pressure of fluid in the plenum chamber 12 is increased and the plenum chamber 13 is evacuated or its volume is reduced accordingly in response to appropriate regulation of the valve 50.

The axially shiftable conical flanges 1a, 2a are non-rotatably coupled with the corresponding shafts A and B by way of toothed connections 61, 62. The rotation-preventing connections 61, 62, each of which includes an internal gear of the respective conical flange 1a, 2a and an external gear of the respective shaft A, B, permit axial shifting of the conical flanges 1a, 2a along the corresponding shafts A, B.

The dot-dash positions of (a) the axially shiftable conical flange 1a in the upper half of the representation of the driving pair 1 of conical flanges and (b) of the chain 3 correspond to the maximum ratio of the transmission to a higher speed. The dot-dash position of the chain 3 at the pair or set 1 of conical flanges corresponds to the solid-line position of the chain 3 at the set 2 of conical flanges.

The dot-dash positions (a) of the axially shiftable conical flange 2a in the lower half of the representation of the driven pair 2 of conical flanges and (b) of the chain 3 correspond to the maximum ratio of the transmission to a lower speed. Such position of the chain 3 corresponds to the solid-line position shown in the upper half of the representation of the first set 1 of conical flanges.

The flanges 1a, 2a have radially inner centering portions 63, 64 resp. 65, 66 by means of which they are mounted and centered directly on the corresponding shafts A and B. The guide portions 63, 64 of the axially shiftable flange 1a are mounted practically without play relative to the external surface of the shaft A and cooperate with the channels 59, 60 to form valves, i.e., the flange 1a actually performs the function of a mobile valving element for the channels 59, 60. When the flange 1a is shifted in a direction to the right from the position shown in the upper half of the representation of the set 1 of flanges, a certain initial stage of such shifting is followed by a stage during which the guide portion 64 gradually seals the channel 60 in response to axial movement of the flange 1a. This means that the guide portion 64 is located radially over the channel 60. In such position of the flange 1a, the radially outer end of the channel 59 is also sealed by the conical flange 1a, namely by the guide portion 63. As the flange 1a continues its axial movement in a direction toward the flange 1b, the channel 60 remains sealed but the flange 1a, and more specifically its guide or regulating portion 63, gradually opens the channel 59. This enables the channel 59 to establish communication between the plenum chamber 9 of the piston-cylinder unit 4 and a channel 58 which, in turn, enables the channels 57, 56 and 55 to establish communicatino with the plenum chamber 23. Since the channel 60 is practically sealed and the plenum chamber 9 can communicate with the plenum chambers 22 and 23—and if one disregards eventual minor losses due to the flow resistance in the fluid paths—the pressure in the two plenum chambers 22, 23 practically matches that in the plenum chamber 9 as well as that in the chamber 6 which is communicatively connected therewith by way of the channel 35 and the conduits 37, 38. Owing to the transmission ratio-dependent connection between the two plenum chambers 22 and 23, the axially effective surface of the fluid cushion in the torque sensor 14 is increased, namely because, as far as their effect is concerned, the axially effective surfaces of the two plenum chambers 22, 23 are added to each other. The result of such increase of the axially effective supporting surface is that, with reference to a given torque, the pressure being built up by the torque sensor 14 is reduced substantially proportionally with the aforementioned increase of the axially effective surface which, in turn, entails that the fluid pressure in the plenum chambers 9 and 6 is also reduced to the same extent. Thus, the novel torque sensor 14 renders it possible to achieve a modulation of pressure which is dependent upon the transmission ratio and is superimposed upon the torque-dependent modulation of fluid pressure.

The channels 59, 60 are disposed and designed, with reference to each other and to the cooperating portions 63, 64 of the flange 1a, in such a way that the switchover from one plenum chamber 22 to both plenum chambers 22, 23, or vice versa, takes place at a transmission ratio of 1:1 of the infinitely variable transmission. However, the design can be such that the switchover need not take place abruptly, i.e., there can be established a transition zone in which the evacuating channel 60 is already sealed but the channel 43 is yet to communicate with the plenum chamber 9. In order to ensure a satisfactory operation of the transmission, i.e., of the torque sensor 14, in such transition zone, namely to ensure that the disc cam 19 can move axially, there are provided compensating means which permit a volumetric change of the plenum chamber 23 so that the torque sensor 14 is capable of carrying out a pumping action. This means that the parts of the cylinder and the parts of the piston of the torque sensor 14 must be free to move axially relative to each other. Such compensating means are constituted by a tongue- or lip-seal 67 which is received in a radial groove of the annular component 24 and cooperates with the cylindrical internal surface of the component 25 to seal the plenum chambers 22, 23 from each other. The sealing ring 67 is designed and disposed in such a way that it seals and thus prevents an equalization of pressures between the two chambers 22 and 23 in only one axial position whereas, in the other axial direction, an equalization of pressures (i.e., the flow of fluid through the seal 67) is possible at least in the presence of a positive pressure differential between the plenum chamber 23 and the plenum chamber 22. Thus, the sealing ring 67 functions in a manner similar to a check valve in that it prevents the flow of fluid from the plenum chamber 22 into the plenum chamber 23 but the fluid can flow through the sealing location established by the sealing ring 67 when the pressure in the plenum chamber 23 exceeds the pressure in the plenum chamber 22 by a certain value. Thus, when the disc cam 19 moves in a direction to the right, pressurized fluid can flow from the sealed plenum chamber 23 into the plenum chamber 22. During a next-following movement of the disc cam 19 in a direction to the left, a subatmospheric pressure can develop in the plenum chamber 23 and it is even possible that the oil in the chamber 23 contains small bubbles of air. However, this does not adversely affect the operation of the torque sensor and/or of the infinitely variable speed transmission with conical flanges.

In lieu of the seal 67 which acts as a check valve, it would be possible to provide a check valve which would operate between the two plenum chambers 22, 23 and which would be installed in the annular component 24. It would then be possible to employ a sealing device which would replace the seal 67 and which would act in both axial directions. Furthermore, it would be possible to employ a check valve which would act between the channels 35 and 58. Such check valve would have to be arranged in a manner that it would permit a volumetric flow of fluid from the plenum chamber 23 in a direction toward the plenum chamber 22 but the valve would block the flow of fluid in the opposite direction.

The preceding description of the operation indicates that, practically within the entire partial range when the transmission serves as an RPM reducing means (underdrive), the axial force which is being generated at the ball-guiding ramps of the disc cams 18, 19 is taken up only by the axially effective surface which is presented by the plenum chamber 22. On the other hand, practically within the entire portion of the transmission range when the transmission converts to a higher RPM (overdrive), the axial force which is being generated by the ball-guiding ramps of the disc cam 19 is taken up by the combined effective surfaces of the plenum chambers 22, 23. Thus, and assuming the presence of the same input torque, the pressure which is generated by the torque sensor 14 during downshifting of the transmission into a lower speed is higher than that generated by the torque sensor 14 during upshifting of the transmission into a higher speed. As already pointed out hereinbefore, the illustrated transmission is designed in such a way that the switchover point which effects the establishment or termination of communication between the plenum chambers 22, 23 is located in the region of the transmission ratio of 1:1. However, by resorting to an appropriate layout and an appropriate design of the channels 59, 60 and the portions 63, 64 of the conical flange 1a (which cooperate with these channels), the switchover point or the switchover range can be shifted accordingly within the entire range of the infinitely variable speed transmission.

The establishment or interruption of communication between the two plenum chambers 22, 23 can also take place by way of a special valve which can be provided for such purpose and can be installed in the region of a channel connecting the two plenum chambers 22, 23 to each other. Such valve need not be actuatable directly by the flange 1a or 2a but rather, for example, by an external energy source. To this end, one can employ, for example, an electromagnetically, hydraulically or pneumatically actuatable valve which can be operated in dependency upon the transmission ratio resp. change of ratio of the transmission. For example, one can resort to a 3/2 valve which establishes communication between or seals the plenum chambers 22, 23 from each other. However, it is also possible to employ pressure-responsive valves. A corresponding valve could be provided in the region of a conduit connecting the channels 35 and 58 with each other; in such instance, the channels 59, 60 are sealed or omitted. The corresponding valve is set up resp. connected in such a way that, when the plenum chambers 22, 23 are sealed from each other, the valve relieves the pressure in the plenum chamber 23. To this end, the valve can be connected with a conduit leading to the oil sump.

If one employs a valve which is regulatable from without, such valve can be actuated in dependency upon other or additional parameters. For example, such valve can also be regulated in dependency upon surges of torque which develop in actual use of the transmission. In this manner, one can prevent or at least reduce the likelihood of slippage of the chain 3, at least under certain circumstances of use, i.e., during certain ratios of the infinitely variable speed transmission.

The torque sensor 14 is installed at the input side adjacent the axially shiftable conical flange 1a. However, the torque sensor can be installed, and adapted accordingly, at any desired location in the torque transmitting path. Thus, and as already known per se, the torque sensor 14 can also be installed at the output side, for example, on the driven or output shaft B. Such a torque sensor can be installed—in a manner analogous to the mounting of the torque sensor 14—adjacent the axially shiftable conical flange 2a. Furthermore, and as also known per se, it is possible to employ several torque sensors. For example, suitable torque sensors can be disposed at the input and output sides.

In addition, the novel torque sensor 14 with at least two plenum chambers 22, 23 can be combined with other devices which are known per se and enable the torque sensor to effect a torque-dependent and/or transmission ratio-dependent pressure modulation. For example, and in a manner similar to that described in the pulished German patent application Serial No. 42 34 294 and in the corresponding U.S. Pat. No. 5,295,915 (the disclosure of which is incorporated herein by reference) radial direction along cooperating rolling movement permitting ramps or paths in dependency upon changes of the transmission ratio.

The inner plenum chamber 6 is connected with the torque sensor 14. However, it is also possible to apply the pressure supplied by the torque sensor 14 to the outer plenum chamber 13; the inner plenum chamber 6 then serves to effect changes of transmission ratio. To this end, it is merely necessary to alternate or to interchange the connections of the two conduits 52 and 37 at the second set 2 of conical flanges.

The component parts of the torque sensor 14 are made predominantly of sheet metal, e.b., by embossing. This applies primarily for the disc cams 18 and 19 which can constitute shaped sheet metal components.

Figure 2:
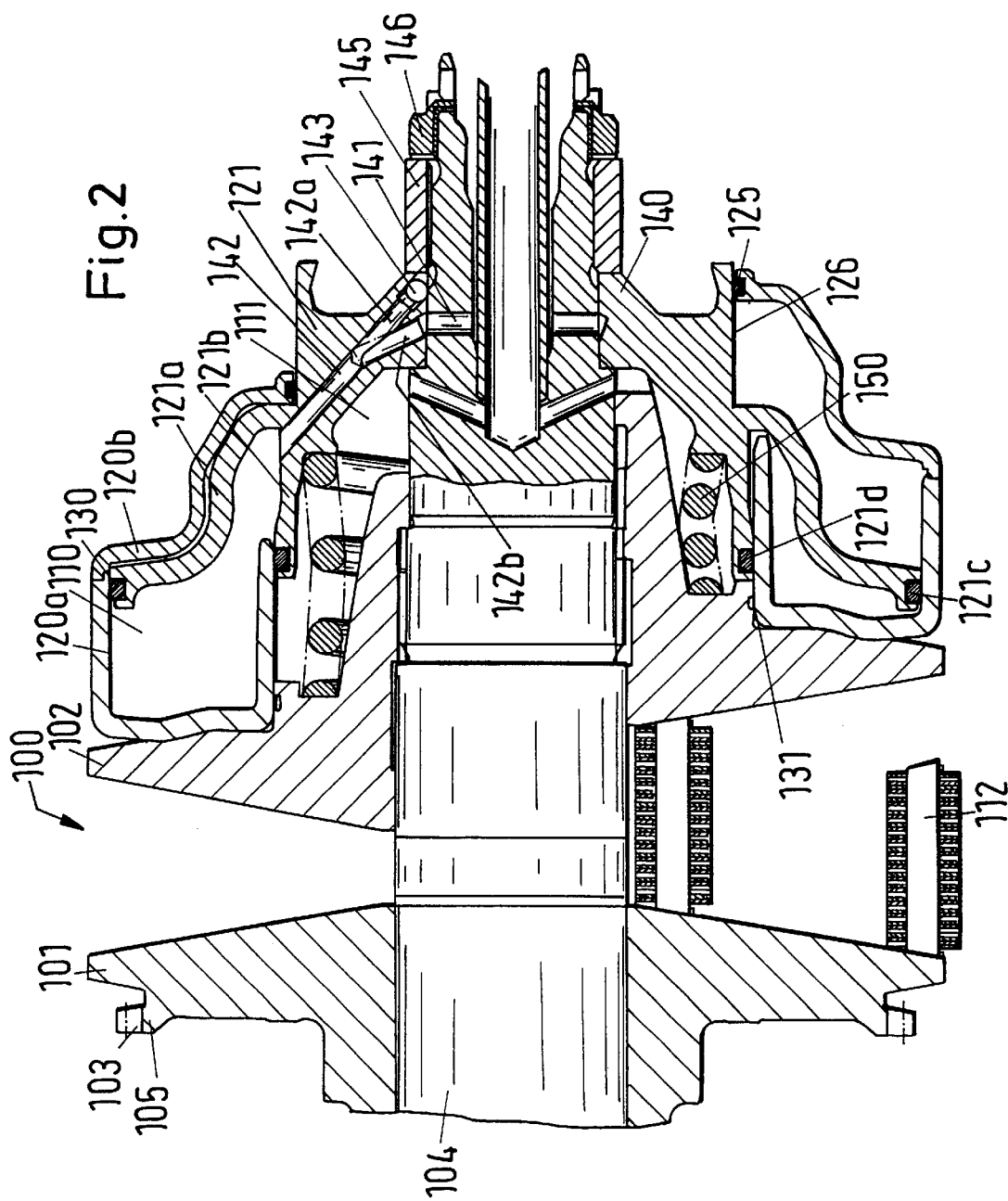

FIG. 2 shows a pair 100 of conical flanges including an axially fixed first conical flange 101 and a second conical flange 102 which is axially shiftable relative to the flange 101. The axially fixed conical flange 101 is fixedly secured to a shaft 104 against axial and angular movements relative thereto, or it is of one piece with or an integral part of the shaft 104. An extension 105 of the conical flange 101 is provided with gear teeth 103 which can mesh, for example, with the teeth of a further element. For example, such further element can constitute the drive shaft for a hydraulic pump, and such drive shaft can receive torque from the shaft 104. Alternatively, or in addition thereto, the teeth 103 can serve as a means for arresting the pair 100 of conical flanges, i.e., as a parking brake.

The axially shiftable conical flange 102 is movable axially of but cannot rotate relative to the shaft 104. The rotation-preventing connection is effected by an internal gear of the conical flange 102 mating with an external gear of the shaft 104. The axial position of the conical flange 102 is changed, and the application of pressure upon the looped chain means 112 between the conical flanges is effected, in response to a planned application of pressure to the fluid in the two plenum chambers 110 and 111.

The plenum chamber 110 is defined, on the one hand, by the essentially circular elements 120a, 120b and, on the other hand, by the circular arms 121a, 121b of an axially fixed element 121. For example, the circular elements can constitute deep drawn parts having radially outer portions which are connected to each other. The element 120a constitutes a part having a c-shaped cross-sectional outline and has a radially extending portion serving as an axial abutment for the conical flange 102. The element 120b has a substantially s-shaped cross-sectional outline and has a radially outer portion which is connected with the element 120a by a welded seam, for example. The radially inner end portion of the element 120b has a receptacle, such as a circumferentially extending groove, receiving a sealing element 125 in sealing contact with the cylindrical surface 126 of the element 121. At the same time, an inner arm of the element 120a is sealingly propped by a seal 131 which is received in a receptacle, such as a circumferentially extending groove, of the flange 102.

The plenum chamber 111 is defined by the shaft 104 and the axially shiftable conical flange 101 on the one hand, and by the radially inner arm of the circular element 120a and the circular element 121 with the arm 121b on the other hand.

The element 121 preferably constitutes a forging or a casting or a sheet metal part, and is held axially by an intermediate part, such as an inner bearing race 145 of a bearing, and by a holding means such as a nut 146. The inner race 145 is form-lockingly, such as non-rotatably, connected with the shaft 104 against movement in a circumferential direction. It could be equally advantageous to frictionally secure the inner race 145 to the shaft 104, e.g., by resorting to a press fit. The non-illustrated roller bearing is supported on the housing or case by way of an outer race to thus rotatably journal the shaft 104 in the case. The radially outer end portions of the arms 121a and 121b have receptacles, such as circumferentially extending grooves, for seals 130, 131 with sealing rings 121c, 121d. The holding means 146 has a collar extending radially inwardly into a circumferential groove of the shaft 104 to thus secure the element 121 in a desired axial position. The elements 145 and 146 also serve to journal the shaft 104 by way of a slide- or roller bearing, not shown. In accordance with an advantageous embodiment, these component parts are preferably provided with internal teeth meshing with external teeth of the shaft 104 to thus prevent rotation of such parts and the shaft relative to each other. The inner race 145 of the bearing is non-rotatably connected with the shaft 104. The non-illustrated outer race of the bearing is confined in a receptacle of the transmission case. The rolling elements, such as spheres, cones or cylinders, of the bearing, such as a ball bearing or a cylindrical roller bearing, are preferably received between radially extending webs of the outer race.

The element 121 can be secured to the shaft 104 by way of a form-locking connection including a first set of teeth and a set of mating complementary teeth. In accordance with a further advantageous embodiment, it is advisable to secure the element 121 to the shaft 104 by means of a frictional connection, such as by way of a press fit.

The sealing rings 121c and 121d preferably constitute two-piece sealing rings each with a radially inner elastic annular element, preferably made of an elastomeric material, and a radially outwardly located essentially form stable annular element, for example, of PTFE, such as Teflon. Owing to its resiliency, the elastic annular element urges the non-elastic annular element against a complementary sealing surface, see also FIGS. 5a and 5b.

The plenum chambers 111, 110 are connected, via channels or grooves 140, 141, with a source of supply of pressurized fluid including a hydraulic pump and valves. The channels 140, 141 constitute radially extending bores and communicate with axially extending channels provided in the shaft 104. A channel 141 in the part 121 communicates with the groove 141. The channel 142 is constituted by two bores 142a, 142b, the end portion of the bore 142a being sealed by a plug 143.

A energy storing device 150 is installed in the space in a prestressed condition between the axially fixed element 121 and the axially shiftable conical flange 102. The end convolutions of this energy storing device are confined in receiving portions in which they are braced or propped in the axial and radial directions.

The upper half of FIG. 2 shows the flanges 101, 102 in positions they assume when the ratio of the transmission is low, and the lower half of FIG. 2 shows the flanges in positions when the ratio of the transmission is high. In the upper half of this Figure, the energy storing device 150 stores a small amount of energy and only its end convolutions abut the adjacent parts. In this illustration, the outline of the energy storing device 150 is readily observable. The radius decreases toward the center of the device 150 and thereupon increases again toward both end portions. In the lower half of FIG. 2, the energy storing device 150 stores a relatively large amount of energy and, in addition to its end convolutions, a median convolution also abuts the hub 102a (FIGS. 3a, 3b) of the conical flange and is centered by the latter.

Figure 3A:
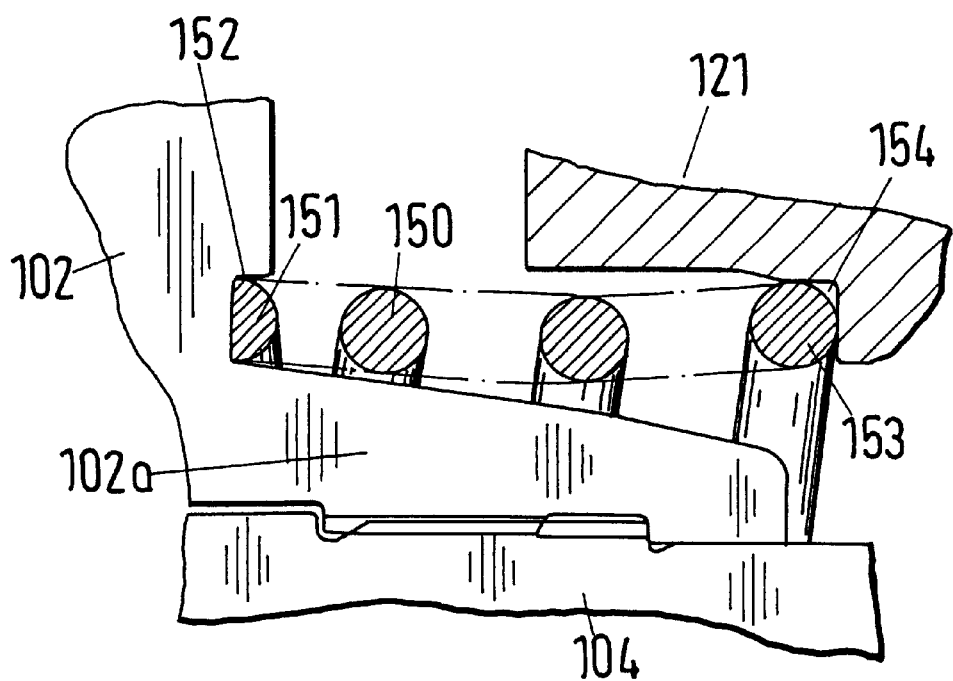
Figure 3B:
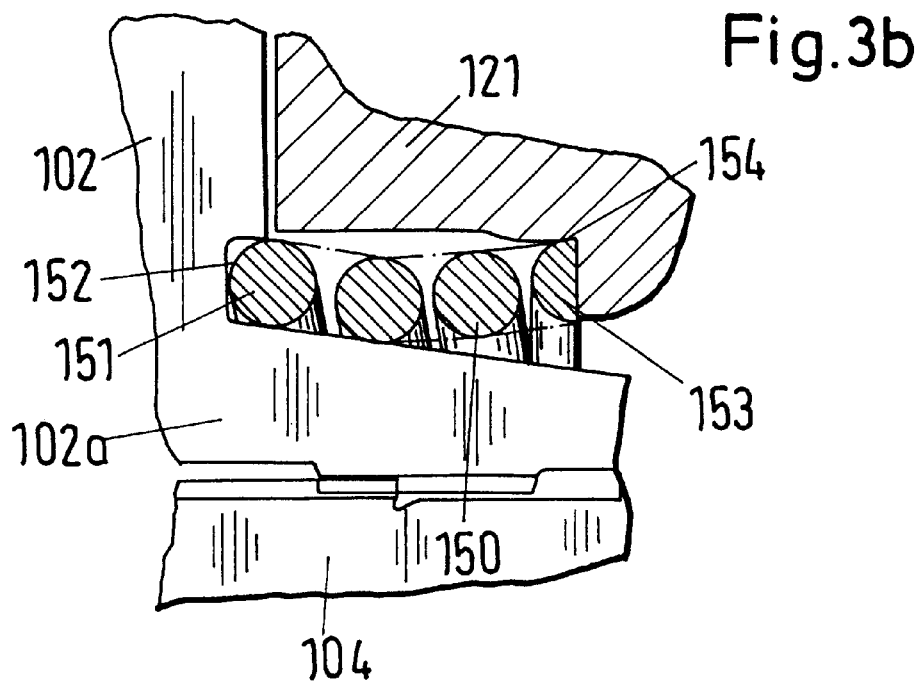

FIGS. 3a and 3b illustrate the energy storing device 150 which is a coil spring installed between the axially shiftable conical hub 102 and the axially fixed element 121. In FIG. 3a, the transmission ratio is low and the two conical flanges are located relatively close to each other. In FIG. 3b, the transmission ratio is high and the two conical flanges are disposed at a relatively large distance from each other. One end convolution 151 of the energy storing device 150 is located in a receptacle or pocket 152 of conical flange 102. In such position, the convolution 151 of the energy storing device 150 is propped axially as well as confined against radially outward movement. The other end convolution 153 of the energy storing device 150 is propped axially and confined against movement radially outwardly by the fixed element 121 in the region of a receptacle or recess 154. The pocket 152 is a circumferential groove of the conical flange 102. The recess 154 constitutes an end region adjacent a radially oriented shoulder. In FIG. 3a, the second left-hand convolution is not centered or supported radially inwardly whereas, in the compressed condition of FIG. 3b, such convolution is propped radially from the inside and is centered by the hub 102a of the conical flange 102.

In the embodiment of FIGS. 3a and 3b, the cross section of the wire of the energy storing device 150 is basically round; however it is possible to provide the wire with flats. In another embodiment, the wire of the energy storing device can have an oval or polygonal (such as square or rectangular) cross sectional outline. The spring is preferably installed in such a way that it is subjected to a maximum axial stress when the positions of the two conical flanges 101, 102 correspond to the maximum transmission ratio.

Figure 4:
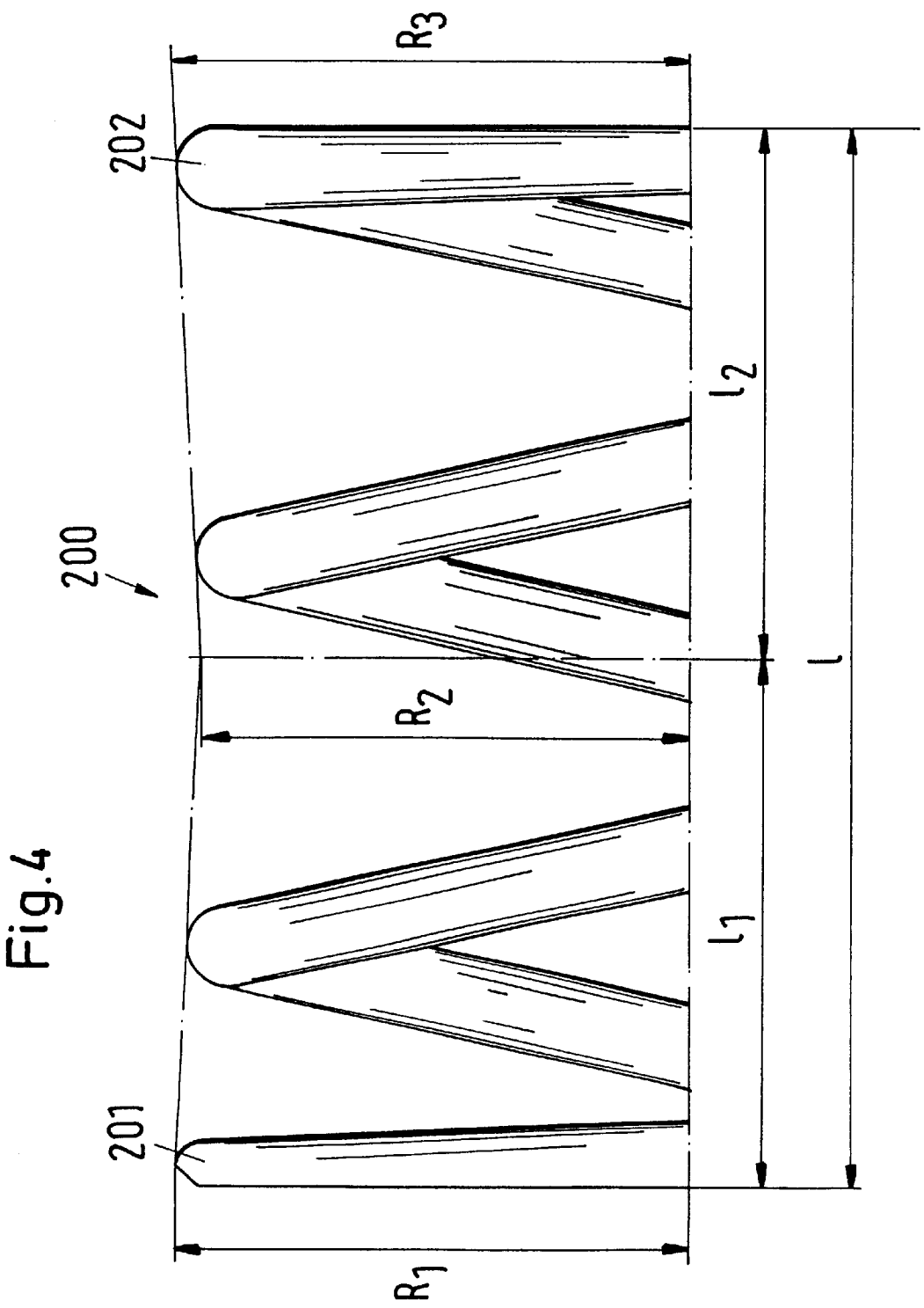

FIG. 4 shows one-half of an energy storing device 200. The end convolutions 201 and 202 respectively have radii $R_1$ and $R_3$ which are larger than the radius $R_2$ at the middle of the spring. The smallest radius $R_2$ can be located at a distance $l_1$ from one end of the spring or at a distance $l_2$ from the other end of the spring, the overall length of the spring being shown at 1. This ensures that the undesirable influence of a negative centrifugal force upon the convolutions is counteracted in such a way that the convolutions do not undergo an undue expansion radially outwardly.

The energy storing device with the decreasing and again increasing cross section is preferably installed in a plenum chamber of the first or upstream pair and/or of the second or downstream pair of conical flanges. It is also of advantage if the energy storing device is disposed outside of a plenum chamber and biases the axially shiftable conical flange. The energy storing device is preferably installed in such a way that it is coaxial with the shaft 104 of the axially shiftable conical flange. In infinitely variable speed transmissions with conical flanges and discrete plenum chambers for the application of pressure in order to change the transmission ratio and to regulate the stressing of the looped means, such as a chain or a belt, it is of advantage to install the energy storing device in the radially inner plenum chamber. In another embodiment, it is equally advantageous to dispose the energy storing device in the radially outer plenum chamber.

In accordance with an advantageous embodiment, it is desirable to locate the energy storing device at that side of a pair of conical flanges which confronts the input shaft of the transmission. In accordance with another embdiment, it is of advantage to install the energy storing device at that side of a pair of conical flanges which is located opposite the input shaft of the transmission.

It is particularly advantageous if the energy storing device comprises only a few convolutions, preferably between 2 and 8 convolutions, such as especially 3 to 6 convolutions, e.g., 4 convolutions.

Figure 5A:
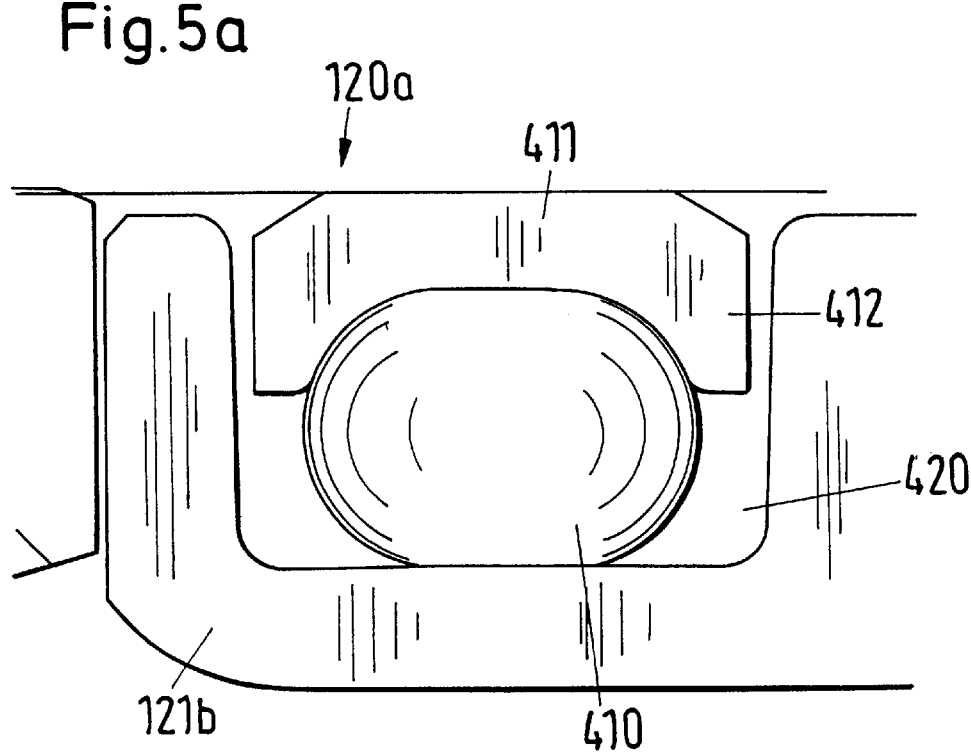
Figure 5B:
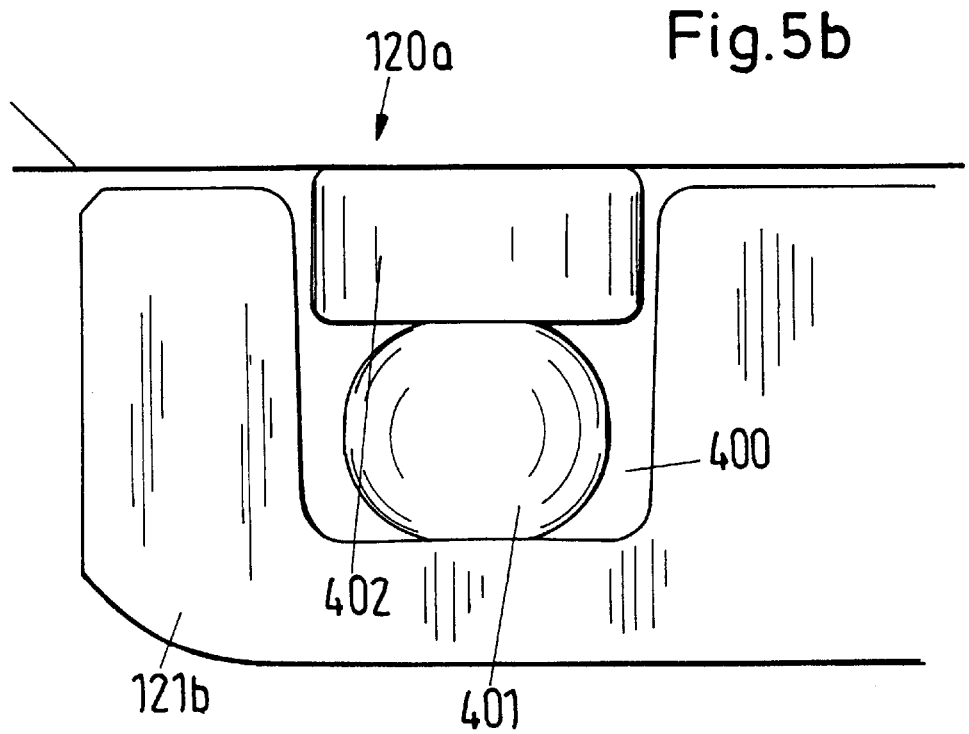

FIGS. 5a and 5b show seals, for example, in the receptacles 400 and/or 420 of the arms 121a, 121b or, in accordance with other advantageous modifications of the novel transmission, also in other components of the infinitely variable speed transmission with conical flanges. The seals are provided in order to seal plenum chambers or piston-cylinder units. In the receptacles, there is confined an annular elastic sealing ring 401, 410 the radially outer side of which is overlapped by a non-elastic annular element 402, 411. The basically non-elastic or basically shape-retaining annular element 402, 411 is biased by the elastic ring against a complementary sealing surface of the element 120a to thus seal the corresponding space. The shape-retaining ring, which is located radially outwardly, can be susceptible of stretching in the axial direction, see the FIG. 5b, or it can be provided with lateral cheeks 412 which extend inwardly in the radial direction and receive the elastic ring 410 between them to secure the ring 410 in the axial direction. Thus, the shape-retaining rings can assume a substantially u-shaped configuration in that they comprise an annular radially outer surface overlying a complementary surface. In accordance with the inventive concept, the seal can also be designed in such a way that the elastic ring is disposed radially outwardly and the shape-retaining ring is located radially inwardly of the elastic ring. The cheeks 412 can extend radially outwardly and the sealing surface can be located radially inwardly.

The invention further relates to published German patent application Serial No. 195 44 644 and to the coresponding U.S. Pat. No. 5,711,730, the disclosure of which is incorporated by reference into the disclosure of the present application.

What is claimed is:

1. A continuously variable speed transmission, comprising:

a shaft rotatable about a predetermined axis;

a rotary pulley coaxial with said shaft and including a first member non-rotatably connected to said shaft and a second member non-rotatably connected to and movable axially on said shaft, said second member includes a conical flange; and at least one energy storing device reacting against said first member and arranged to bias said second member axially of and along said shaft, said device having an at least substantially circular non cylindrical external surface, wherein said external surface includes a first section tapering in a first axial direction of said shaft and a second section tapering in a second axial direction counter to said first direction.

2. The transmission of claim 1, wherein said at least one energy storing device includes a compression spring.

3. The transmission of claim 1, wherein said at least one energy storing device comprises a coil spring having a plurality of convolutions including at least one first convolution having a first diameter and at least one second convolution having a second diameter.

4. The transmission of claim 1, wherein said external surface has the outline of a double cone.

5. The transmission of claim 1, wherein at least one of said members has a recess for a portion of said at least one energy storing device.

6. The transmission of claim 3, wherein said at least one first convolution is an end convolution of said coil spring and said at least one second convolution is an intermediate convolution of said coil spring.

7. The transmission of claim 5, wherein said at least one member has a surface bounding said recess and limiting radially outward movements of said portion of said at least one energy storing device.

8. The transmission of claim 6, wherein the diameter of said end convolution exceeds the diameter of said intermediate convolution.

9. The transmission of claim 7, wherein said recess is a circular recess provided in said second member, said surface including a portion abutting said portion of said at least one energy storing device in the direction of said axis.

10. The transmission of claim 7, wherein said recess is provided in said first member and said at least one energy storing device includes a coil spring having a plurality of convolutions including two end convolutions, said portion of said at least one energy storing device including one of said end convolutions and said surface including a portion abutting said one end convolution in the direction of said axis.

11. The transmission of claim 8, wherein said coil spring has a plurality of intermediate convolutions.

12. The transmission of claim 9, wherein said at least one energy storing device comprises a coil spring having a plurality of convolutions and said portion of said at least one energy storing device includes an end convolution of said coil spring.

13. A continuously variable speed transmission, comprising:

a shaft rotatable about a predetermined axis;

a rotary pulley coaxial with said shaft and including a first flange affixed to said shaft and a second flange rotatable with and movable axially of said shaft; and at least one energy storing device reacting against said first flange and arranged to bias said second flange axially of and along said shaft, said device having an at least substantially circular non-cylindrical external surface, wherein said external surface includes a first section tapering in a first axial direction of the said shaft and a second section tapering in a second axial direction counter to the first direction;

an endless torque transmitting element having a portion trained over said pulley;

at least one plenum chamber; and means for sealing said chamber, including an elastic first annular sealing element and an at least substantially rigid second annular sealing element.

14. The transmission of claim 13, further comprising means for moving said second flange axially of said shaft, said moving means including said plenum chamber.

15. The transmission of claim 13, wherein one of said sealing elements is disposed within the other of said sealing elements as seen radially of said axis.

16. The transmission of claim 13, wherein one of said sealing elements is located at a first radial distance and the other of said sealing elements is located at a different second radial distance from said axis.

17. The transmission of claim 13, further comprising a torque sensor including said plenum chamber.

18. The transmission of claim 13, wherein said at least one energy storing device comprises a coil spring having a plurality of convolution including at least one first convolution having a first diameter and at least one second convolution having a second diameter.

* * * * *